United States Patent [19]

Hashimoto

[11] 4,056,249
[45] Nov. 1, 1977

[54] ENGINE MOUNTING APPARATUS
[75] Inventor: Masaharu Hashimoto, Hirakata, Japan
[73] Assignee: Kabushiki Kaisha Komatsu Seisakusho, Tokyo, Japan
[21] Appl. No.: 699,580
[22] Filed: June 24, 1976
[30] Foreign Application Priority Data
June 25, 1975  Japan .................. 50-87285[U]
[51] Int. Cl.² .................................... F16F 15/00
[52] U.S. Cl. ........................ 248/9; 248/358 R
[58] Field of Search .............. 248/9, 15, 20-22, 248/358 R; 267/153; 151/33

[56]        References Cited
       U.S. PATENT DOCUMENTS

| 1,707,214 | 3/1929 | Lord | 248/358 X |
| 1,717,711 | 6/1929 | Lee | 248/9 |
| 1,855,769 | 4/1932 | Paton | 248/9 |
| 2,711,871 | 6/1955 | Eck | 248/22 |
| 2,890,734 | 6/1959 | Mullin | 151/33 |
| 2,911,207 | 11/1959 | Coble et al. | 248/22 X |
| 3,035,799 | 5/1962 | Peirce | 248/15 |
| 3,842,945 | 10/1974 | Potter | 248/21 X |

FOREIGN PATENT DOCUMENTS 402,389  2/1932  United Kingdom .............. 248/9

Primary Examiner—Lawrence J. Staab
Attorney, Agent, or Firm—Armstrong, Nikaido & Marmelstein

[57]                ABSTRACT

An engine mounting apparatus which comprises a base frame, a bracket for the engine and a cushion rubber disposed therebetween. The cushion rubber functions to absorb vibration.

Said bracket is fastened to said base frame by means of bolts and bushings are disposed on the periphery of said bolts within said bracket and said cushion rubber.

4 Claims, 3 Drawing Figures

ENGINE MOUNTING APPARATUS

BACKGROUND OF THE INVENTION

This invention relates to an engine mounting apparatus.

Installing or connecting two or more mechanical parts together via cushion rubber is known by German Patent No. 937,134 or German Patent Publication No. 1,063,426. These prior art, however, do not disclose or relate to an apparatus for mounting the engine on the vehicle body.

SUMMARY OF THE INVENTION

According to the present invention, there is disclosed an engine mounting apparatus comprising a base frame having first, second and third holes formed therein;

a bracket for the engine mounted on said base frame, said bracket having first, second and third holes formed therein corresponding to said holes in said base frame;

a cushion rubber disposed between said base frame and said bracket, said cushion rubber having first, second and third holes formed therein corresponding to said holes in said base frame, diameters of said holes in said cushion rubber being larger than those of the corresponding holes in said bracket;

a first bushing having small and large diameter portions disposed in said first holes formed in said bracket and said cushion rubber; second and third bushings having small and large diameter portions disposed in said second and third holes formed in said bracket and said cushion rubber respectively;

a pin adapted to be thrusted in said first hole formed in said base frame through said first bushing; and bolt means disposed in said second and third holes formed in said base frame through said second and third bushings thereby fastening said bracket to said base frame.

It is, therefore, an object of the present invention to provide an engine mounting apparatus which prevents transmission of vibration caused by the engine to the vehicle body through said mounting parts.

Another object of the present invention is to provide an engine mounting apparatus whereby disassembly, reassembly and adjustments of the component parts can be easily carried out.

Other objects, features and advantages of the present invention will be readily apparent from the following description taken in conjunction with the accompanying drawings in which like reference numerals indicate the same parts throughout.

BRIEF DESCRIPTION OF THE INVENTION

DETAILED DESCRIPTION OF THE PREFERRED EMBODIMENTS

Figure 1:
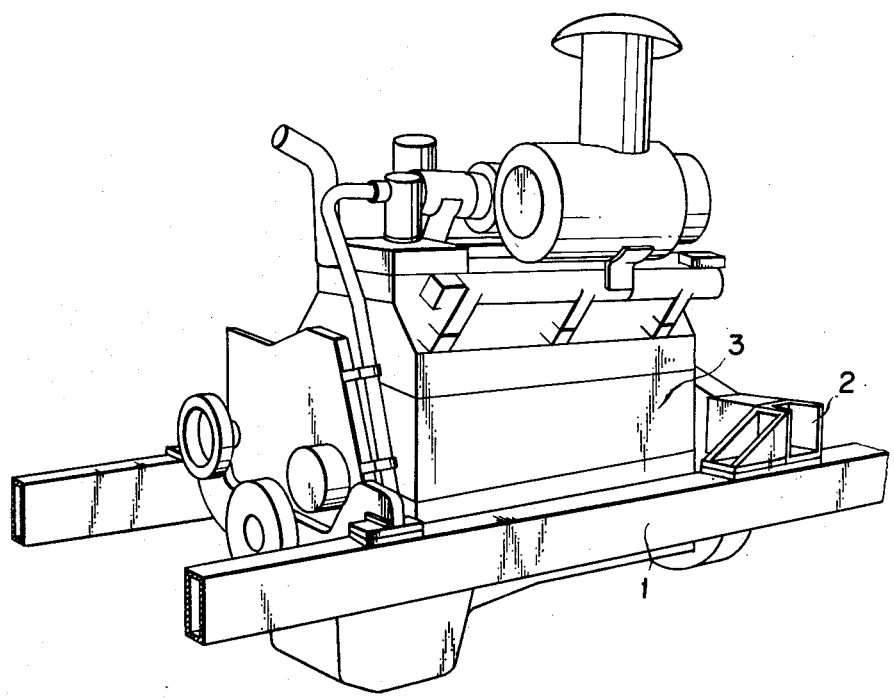
FIG. 1 is a schematic illustration showing the engine mounting apparatus according to the present invention.

The present invention will now be described in detail below with reference to the accompanying drawings. Reference numerals 1 denotes a base frame and 2 a bracket for an engine 3. The base frame 1 has formed therein a hole 4 for pin 17 and screw threaded holes 5 and 6 for bolts. The bracket 2 has formed therein a hole 7 through which the pin 17 is thrusted and holes 8 and 9 through which the bolts are screwed in the vibration-proof member 10 made of rubber is interposed between the base frame 1 and the bracket 2. The vibration-proof member 10 has formed therein holes 11, 12 and 13 corresponding to said holes 7, 8 and 9.

An upper small diameter portion 14a of a bush 14 is thrusted into the hole 7, whilst a lower large diameter portion 14b of which is inserted into the hole 11. A stepped portion 14c defined between the portions 14a and 14b is arranged to be kept into contact with the lower surface of the bracket 2, and a clearance $t_1$ is provided the lower surface of the bush 14 and the base frame 1. The bush 14 serves to position the engine relative to the base frame 1 and controls the longitudinal and transverse thrust loads through the pin 17. Small diameter portions 15a and 16a of bushes 15 and 16 are inserted into said holes 8 and 9, respectively, whilst large diameter portions 15b and 16b of the same are inserted into the holes 12 and 13, respectively. A clearance $t_2$ is provided between the lower surface of the bracket 2 and a stepped portion 15c defined between the large and small diameter portions 15b and 15a of the bush 15, and a stepped portion 16c defined between the large and small diameter portions 16b and 16a of the bush 16, respectively. These large diameter portions 15b and 16b serves as a stopper, respectively. The pin 17 is thrusted through the bush 14 into the hole 4.

Bolts 18 and 19 are inserted into the bushes 15 and 16, respectively. These bolts 18 and 19 are threadably engaged with the screw threaded holes 5 and 6 so that retainer members 20 and 21 adapted to retain the bushes 15 and 16 can be urged against the upper surfaces of the latter. A stopper means is attached to the bolts 18 and 19.

Thus, the engine 3 can be mounted on the bracket 2 and through the vibrationproof member 10 on the base frame 1, and can be positioned by means of the pin 17.

Figure 2:
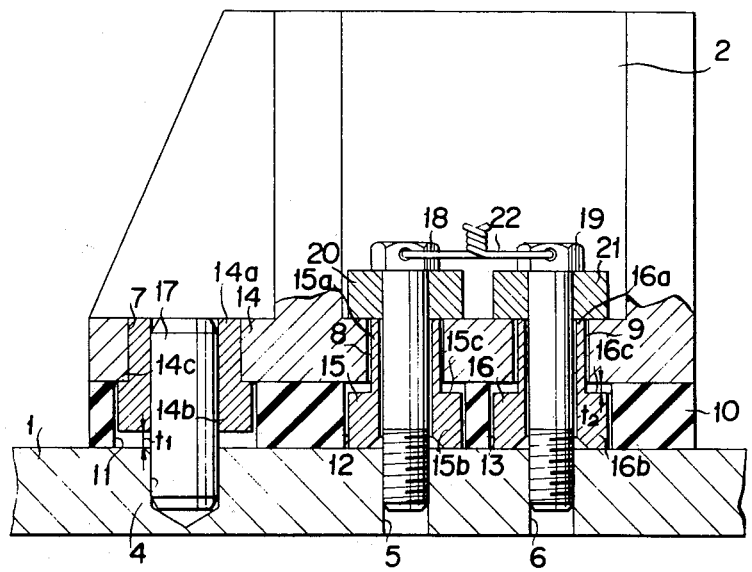
FIG. 2 is a longitudinal cross sectional view of the present invention.
Figure 3:
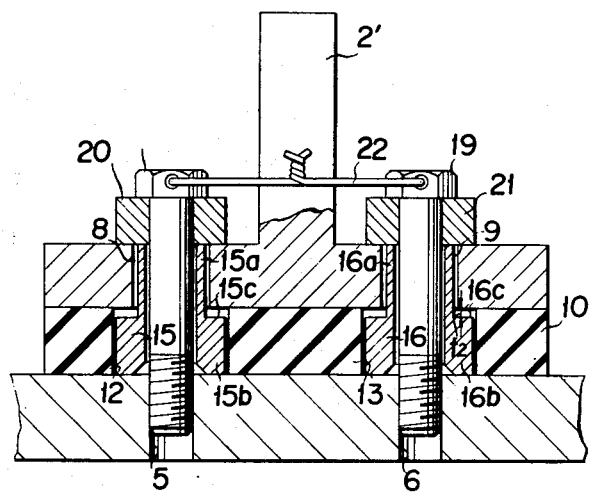
FIG. 3 is similar to FIG. 2 but showing another modification of the present invention.

FIG. 3 shows a longitudinal cross sectional view of another bracket portion adapted to mount the engine 3 on the base frame 1, that is; engine mounting apparatus of the bracket 2' of FIG. 1. The mounting means of FIG. 3 differs from that of FIG. 2 in that the former is not provided with the pin 17 shown in FIG. 2. Other component of the mounting means of FIG. 3 is same as that of FIG. 2, and therefore its detailed explanation is omitted herein.

Since the present invention is constructed as mentioned hereinabove, the bushes 14, 15 and 16 can be also used as stoppers so that there is no need of fabricating the bushes and stoppers in separate parts or units. Further, only one piece of pin is used for engine's positioning to ensure that disassembly, reassembly and adjusting operations can be more readily effected.

It is to be understood that the above description is by way of example only, and that details for carrying the invention into effect may be varied without, departing from the scope of the invention claimed.

What is claimed is:

1. An engine mounting apparatus comprising a base frame having first, second and third holes formed therein;

a bracket for the engine mounted on said base frame, said bracket having first, second and third holes formed therein corresponding to said holes in said base frame;

a cushion rubber disposed between said base frame and said bracket said cushion rubber having first, second and third holes formed therein corresponding to said holes in said base frame, diameters of said holes in said cushion rubber being larger than those of the corresponding holes in said bracket;

a first bush having small and large diameter portions disposed in said first holes formed in said bracket and said cushion rubber; second and third bushes having small and large diameter portions with a shoulder formed therebetween, said second and third bushes disposed in said second and third holes formed in said bracket and said cushion rubber respectively wherein a first gap is provided between said base frame and said first bush and a second gap is provided between said bracket and shoulder portion of said second and third bush respectively;

a pin adapted to be set in said first hole formed in said base frame through said first bush; and bolt means disposed in said second and third holes formed in said base frame through said second and third bushes thereby fastening said bracket to said base frame.

2. The engine mounting apparatus as defined in claim 1 wherein said first gap is bigger than that of second one.

3. The engine mounting apparatus as defined in claim 1 wherein holding members are disposed between said bracket and heads of said bolts.

4. The engine mounting apparatus as defined in claim 3 wherein rotation preventing means is provided between said bolt heads.

* * * * *